(12) United States Patent
Liu

(10) Patent No.: US 11,016,333 B2
(45) Date of Patent: May 25, 2021

(54) POLARIZER AND LIQUID CRYSTAL DISPLAY DEVICE HAVING POROUS PROTECTIVE LAYER

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventor: Zhi Liu, Beijing (CN)

(73) Assignees: BOE TECHNOLOGY GROUP CO., LTD., Beijing (CN); HEFEI BOE OPTOELECTRONICS TECHNOLOGY CO., LTD., Hefei Anhui (CN)

( * ) Notice: Subject to any disclaimer, the term of this patent is extended or adjusted under 35 U.S.C. 154(b) by 485 days.

(21) Appl. No.: 15/770,935

(22) PCT Filed: Sep. 20, 2017

(86) PCT No.: PCT/CN2017/102431
§ 371 (c)(1),
(2) Date: Apr. 25, 2018

(87) PCT Pub. No.: WO2018/153076
PCT Pub. Date: Aug. 30, 2018

(65) Prior Publication Data
US 2020/0241357 A1    Jul. 30, 2020

(30) Foreign Application Priority Data

Feb. 27, 2017   (CN) .......................... 201710107021.7

(51) Int. Cl.
*G02B 5/30*      (2006.01)
*G02F 1/1335*    (2006.01)

(52) U.S. Cl.
CPC ..... *G02F 1/133528* (2013.01); *G02B 5/3041* (2013.01); *G02B 2207/107* (2013.01); *G02F 1/13356* (2021.01); *G02F 2201/50* (2013.01)

(58) Field of Classification Search
CPC .............. G02B 1/14; G02B 1/30–3075; G02B 27/28–288; G02B 2207/107;
(Continued)

(56) References Cited

U.S. PATENT DOCUMENTS

2002/0089620 A1    7/2002  Yamamoto et al.
2017/0129197 A1*   5/2017  Yaegashi .................. G02B 1/14

FOREIGN PATENT DOCUMENTS

CN    1627107 A    6/2005
CN    1952756 A    4/2007
(Continued)

OTHER PUBLICATIONS

International Search Report and Written Opinion for International Appl. No. PCT/CN2017/102431, dated Dec. 27, 2017.
(Continued)

*Primary Examiner* — Ryan S Dunning
(74) *Attorney, Agent, or Firm* — Dinsmore & Shohl LLP

(57) ABSTRACT

The present disclosure discloses a polarizer and a liquid crystal display device, comprising: a first protective layer (1); a polarizing layer (2), wherein the first protective layer is located on one layer surface of the polarizing layer; and a second protective layer (3) located on another layer surface of the polarizing layer; wherein at least one of the first protective layer (1) and the second protective layer (3) has a porous structure.

24 Claims, 4 Drawing Sheets

(58) Field of Classification Search
CPC ......... G02F 1/133528; G02F 1/133533; G02F 1/133536; G02F 2001/133531; G02F 2001/133538; G02F 2001/133541; G02F 2001/133543; G02F 2001/133545; G02F 2001/133548; G02F 2001/2001; G02F 2001/13355; G02F 2001/13356; G02F 2201/50; G02F 2201/54
USPC .......................... 359/483.01, 487.01, 487.02
See application file for complete search history.

(56) References Cited

FOREIGN PATENT DOCUMENTS

| | | |
|---|---|---|
| CN | 101799564 A | 8/2010 |
| CN | 103675981 A | 3/2014 |
| CN | 204314497 U | 5/2015 |
| CN | 105137521 A | 12/2015 |
| CN | 106772755 A | 5/2017 |
| WO | WO-2014/061605 A1 | 4/2014 |

OTHER PUBLICATIONS

Office Action for CN Application No. 201710107021.7, dated Aug. 3, 2018.

* cited by examiner

POLARIZER AND LIQUID CRYSTAL DISPLAY DEVICE HAVING POROUS PROTECTIVE LAYER

CROSS-REFERENCE TO RELATED APPLICATIONS

This application is a U.S. National Stage under 35 U.S.C. § 371 of International Application No. PCT/CN2017/102431, filed on Sep. 20, 2017, which claims the benefit of priority to Chinese Patent Application No. 201710107021.7, filed on Feb. 27, 2017. The disclosures of each of these applications are fully incorporated herein by reference in entirety.

TECHNICAL FIELD

The present disclosure relates to a polarizer and a liquid crystal display device.

BACKGROUND

A related polarizer comprises a first cellulose triacetate layer, a polyvinyl alcohol layer, a second cellulose triacetate layer, a pressure-sensitive adhesive layer and a release film. After the polyvinyl alcohol layer is extended and stretched, the first cellulose triacetate layer and the second cellulose triacetate layer are arranged on both layer surfaces of the polyvinyl alcohol layer, the pressure-sensitive adhesive layer is arranged on an outer side surface of one of the first cellulose triacetate layer and the second cellulose triacetate layer, and then the release film is arranged on an outer side surface of the pressure-sensitive adhesive layer. In use, the release film on the pressure-sensitive adhesive layer is peeled off, and the polarizers are then attached to both surfaces of the glass substrate (thereby forming a display module), and two absorption axes (one horizontal and one longitudinal) of the two polarizers after the attachment meet the operational requirement (decided by the liquid crystal display principle) of being perpendicular to each other (one is held horizontally and another is held vertically).

The extended and stretched (the absorption axis is in the stretching direction) polyvinyl alcohol layer has a shrinkage characteristic. In a high temperature environment, massive heat transfer through the outer cellulose triacetate layer to the polyvinyl alcohol layer, and after the absorption of the massive heat, the polyvinyl alcohol layer has a larger degree of shrinkage. After the polyvinyl alcohol layer shrinks, the polarizer with a horizontal absorption axis will shrink in a larger degree than the polarizer with a longitudinal absorption axis. The glass substrate is subjected to a larger pulling force from the polarizer with the horizontal absorption axis and then bends (the pulling force is in direct proportion to the shrinkage of the polarizer, and the shrinkage of the polarizer with the horizontal absorption axis is larger than that of the polarizer with the longitudinal absorption axis). As the thickness of the glass substrate decreases, the antiflex performance becomes weaker, the bending becomes more serious, and the flatness of the product becomes worse.

SUMMARY

The present discloses provides a polarizer comprising: a first protective layer; a polarizing layer, wherein the first protective layer is located on one layer surface of the polarizing layer; and a second protective layer located on another layer surface of the polarizing layer; wherein at least one of the first protective layer and the second protective layer has a porous structure.

Alternatively, the porous structure has a porosity of 10~30%.

Alternatively, the porous structure has a pore size distribution of 3~5 μm.

Alternatively, the porous structure is only distributed uniformly on the first protective layer.

Alternatively, the porous structure is only distributed uniformly on the second protective layer.

Alternatively, the porous structure is uniformly distributed on both the first protective layer and the second protective layer.

Alternatively, the polarizer further comprises a connecting layer, and the connecting layer is located on a surface of the second protective layer facing away from the polarizing layer.

Alternatively, the polarizer further comprises: a release film, located on a surface of the connecting layer facing away from the second protective layer.

Alternatively, the first protective layer and the second protective layer comprise a cellulose triacetate layer, the polarizing layer comprises a polyvinyl alcohol layer, and the connecting layer comprises a pressure-sensitive adhesive layer.

Alternatively, a thermal conductivity of the air inside the porous structure is smaller than those of materials of the first protective layer and the second protective layer.

The present disclosure further provides a liquid crystal display device comprising the polarizer according to any one of the above embodiments.

BRIEF DESCRIPTION OF THE DRAWINGS

The drawings are used to provide a further understanding of the technical solutions of the present disclosure, and constitute a part of the specification, and are used, along with the embodiments of the present application, for explaining the technical solutions of the present disclosure, but do not constitute limitations to the technical solutions of the present disclosure.

DETAILED DESCRIPTION

Figure 1:
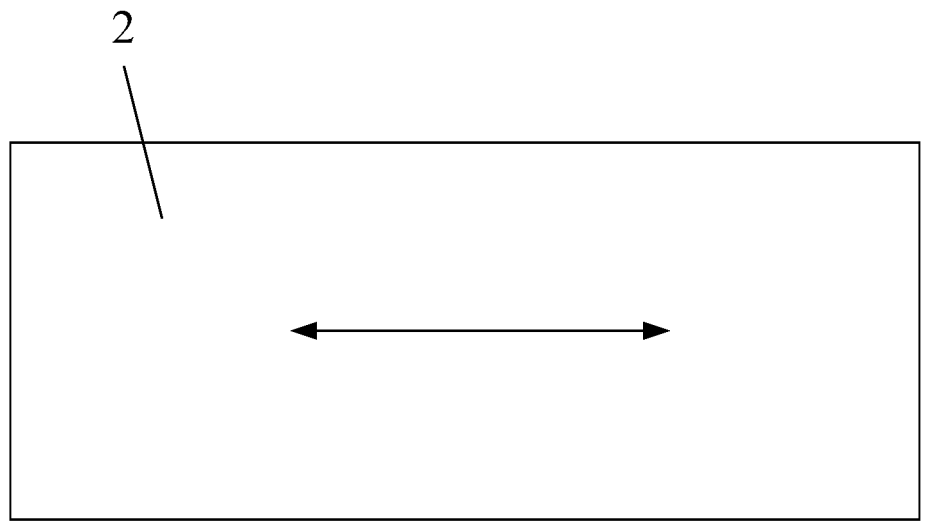
FIG. 1 is a schematic diagram showing a structure of a polarizing layer of the polarizer according to some embodiments of the present disclosure, wherein the absorption axis is horizontal.
Figure 2:
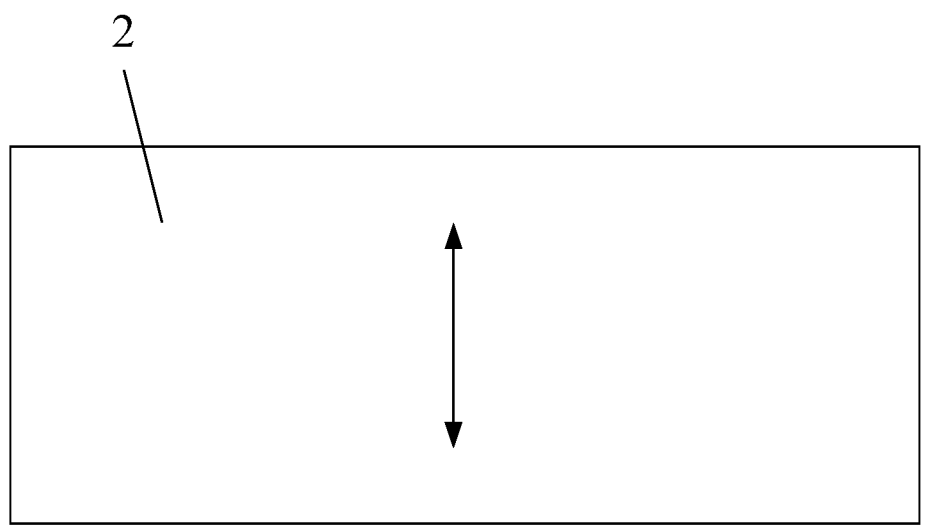
FIG. 2 is a schematic diagram showing a structure of a polarizing layer of the polarizer according to some embodiments of the present disclosure, wherein the absorption axis is longitudinal.

In order to make the objectives, technical solutions, and advantages of the present disclosure clearer and more comprehensible, the embodiments of the present disclosure will be described in detail in the following in combination with the accompanying drawings. If, without conflicts, the embodiments in the present application and features in the embodiments can be combined with each other arbitrarily.

Many details are described in the following to facilitate full understanding of the present disclosure, but the present disclosure can also be implemented in other manners different from what is described herein, so the scope of protection of the present disclosure is not limited by the embodiments disclosed below.

The polarizer and liquid crystal display device according to some embodiments of the present disclosure are described below in conjunction with the accompanying drawings.

The polarizer provided by the present disclosure, as shown in FIGS. 1-6, comprises: a first protective layer 1; a polarizing layer 2, wherein the first protective layer 1 is located on one layer surface of the polarizing layer 2; and a second protective layer 3 located on the other layer surface of the polarizing layer 2; wherein at least one of the first protective layer 1 and the second protective layer 3 has a porous structure 4, and the porous structure 4 prevents the outside heat from transferring to the polarizing layer 2.

In the polarizer provided by the present disclosure, at least one of the first protective layer 1 and the second protective layer 3 have a porous structure 4, and the porous structure 4 can prohibit the outside heat from transferring to the polarizing layer 2 in a better way and can avoid the shrinkage of polarizing layer 2. Therefore, thus fabricated display module can effectively prevent the glass substrate 5 from bending.

A thermal conductivity of the air inside the porous structure is smaller than those of the first protective layer and the second protective layer. In this way, the heat is more difficult to transfer through the porous structure to the polarizing layer, and the internal polarizing layer has a lower temperature and thus is not easy to shrink.

In some embodiments of the present disclosure, the porosity of the porous structure 4 is 10~30%. The thermal conductivity decreases with the increase of porosity, but with the increase of the porosity, the structural performances of the first protective layer 1 and the second protective layer 3 are deteriorated. Since the first protective layer 1 and the second protective layer 3 have supporting and protecting functions with respect to the polarizing layer 2, the porosity is set to 10~30%. However, the range of porosity is not restrictive, and by taking actual situations into account, e.g., the size of the polarizer, the materials of the various layers, the structure of the liquid crystal display device, and etc., the lower limit of the range of the porosity for example may be 9, 7 or 5, and the upper limit for example may be 32, 33 or 35. The pore size distribution of the porous structure 4 is 3~5 μm, to prevent the pore size from becoming too large to affect red-green-blue (RGB) blending of the liquid crystal display (LCD) panel, resulting in sparkling deficiency. Therefore, the pore size distribution is set to 3~5 μm. However, the range of the pore size distribution is not restrictive, and by taking actual situations into account, e.g., the material of the protective layer, the lower limit of the range of the porosity for example may be 1 μm or 2 μm, and the upper limit for example may be 7 μm, 8 μm, or 10 μm.

Figure 3:
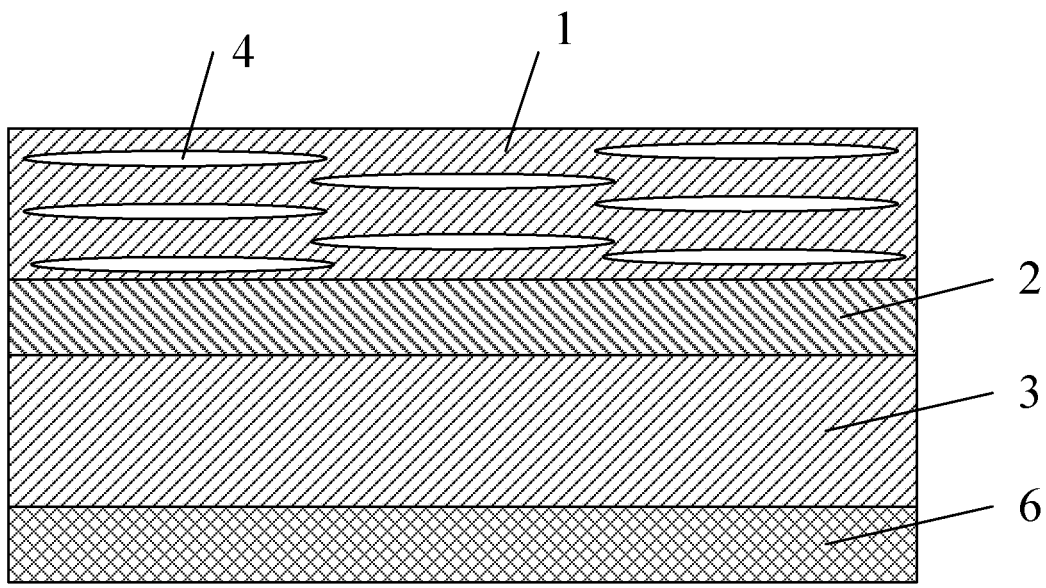
FIG. 3 is a schematic diagram showing a structure of the polarizer according to some embodiments of the present disclosure.

In at least one embodiment of this disclosure, as shown in FIG. 3, only the first protective layer 1 has the porous structure 4.

Alternatively, as shown in FIG. 3, the holes inside the porous structure may be circular holes, a rectangular holes, etc., and the porous structure is uniformly distributed on the first protective layer 1.

The porous structure 4 is uniformly distributed on the first protective layer 1 along a length direction, width direction and thickness direction of the first protective layer 1 simultaneously.

Alternatively, the polarizer further comprises: a connecting layer 6 arranged on a surface of the second protective layer 3 facing away from the polarizing layer 2, for connecting the second protective layer 3 and the glass substrate 5 to fabricate a display module.

Alternatively, the polarizer further comprises: a release film arranged on a surface of the connecting layer 6 facing away from the second protective layer 3.

Alternatively, the first protective layer 1 and the second protective layer 3 comprise a cellulose triacetate layer, the polarizing layer 2 comprises a polyvinyl alcohol layer, and the connecting layer 6 comprises a pressure-sensitive adhesive layer.

According to the embodiment of the present disclosure, the porous structure in the first protective layer 1 can prohibit the heat from the upper side of the figure from transferring to the polarizing layer in a better way, and can avoid shrinkage of the polarizing layer, and the thus fabricated display module can prevent the glass substrate from bending.

Figure 4:
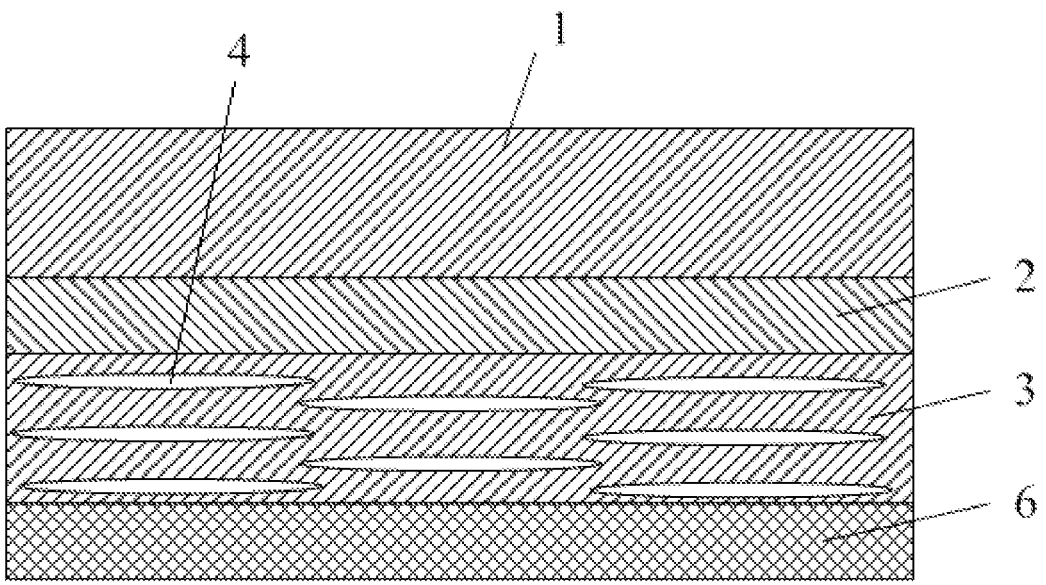
FIG. 4 is a schematic diagram showing a structure of the polarizer according to some other embodiments of the present disclosure.

In at least one embodiment of this disclosure, as shown in FIG. 4, only the second protective layer 3 has the porous structure 4.

Alternatively, the porous structure 4 is uniformly distributed on the second protective layer 3.

The porous structure 4 is uniformly distributed on the second protective layer 3 along a length direction, width direction and thickness direction of the second protective layer 3 simultaneously.

Alternatively, the polarizer further comprises: a connecting layer 6 arranged on a surface of the second protective layer 3 facing away from the polarizing layer 2, for connecting the second protective layer 3 and the glass substrate 5 to fabricate a display module.

Alternatively, the polarizer further comprises: a release film arranged on a surface of the connecting layer 6 facing away from the second protective layer 3.

Alternatively, the first protective layer 1 and the second protective layer 3 comprise a cellulose triacetate layer, the polarizing layer 2 comprises a polyvinyl alcohol layer, and the connecting layer 6 comprises a pressure-sensitive adhesive layer. The release film is attached to an exposed layer surface of the pressure-sensitive adhesive layer, to guarantee viscosity of the pressure-sensitive adhesive layer and prevent dirt from attaching to the pressure-sensitive adhesive layer.

According to the embodiment of the present disclosure, the porous structure in the second protective layer can better prohibit the heat from the lower side in the figure from transferring to the polarizing layer, and can avoid shrinkage of the polarizing layer, and the thus fabricated display module can prevent the glass substrate from bending.

Figure 5:
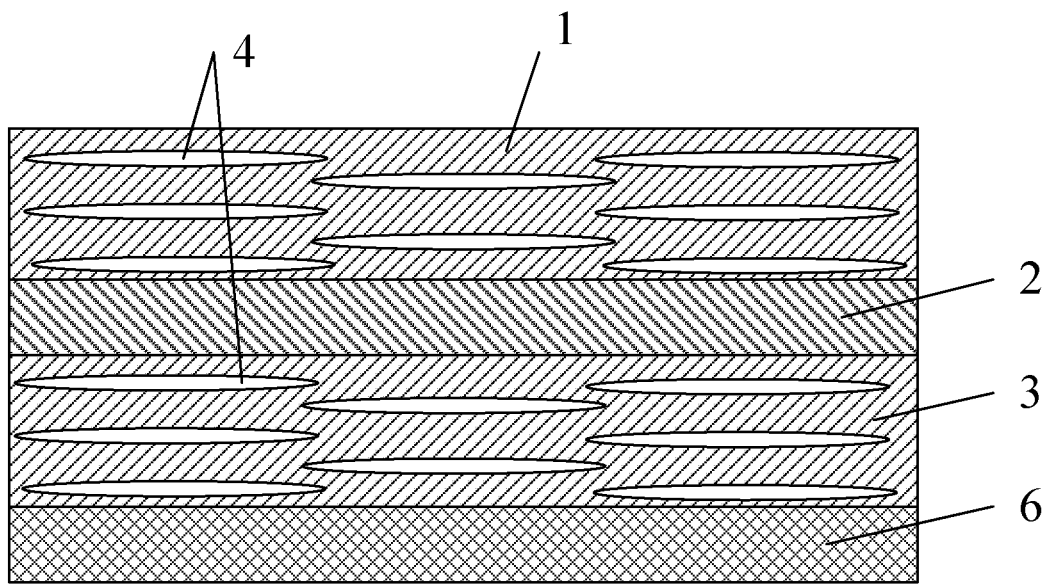
FIG. 5 is a schematic diagram showing a structure of the polarizer according to some further embodiments of the present disclosure.
Figure 6:
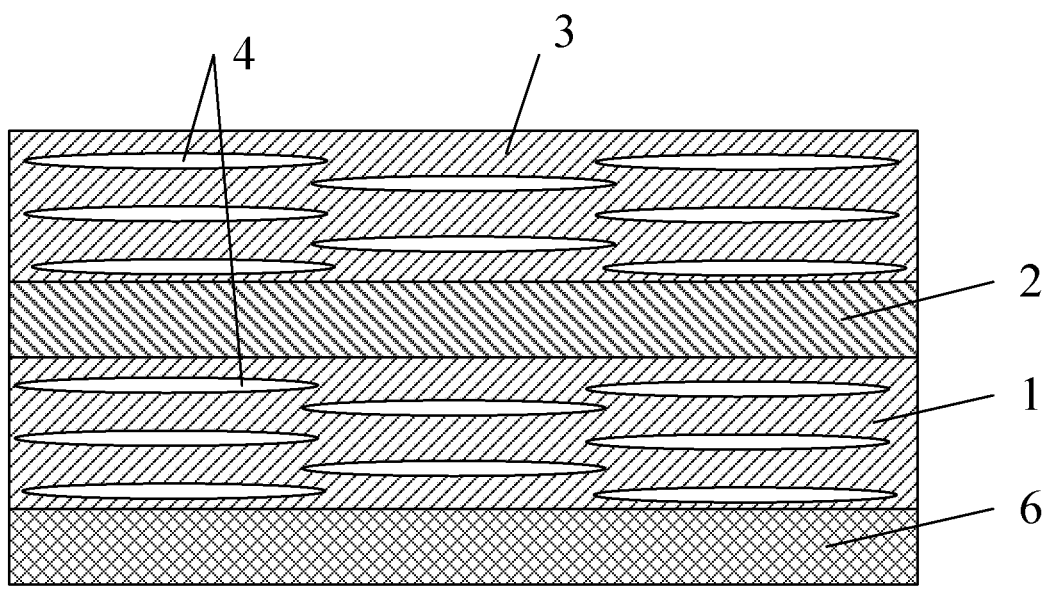
FIG. 6 is a schematic diagram showing a structure of the polarizer according to some more embodiments of the present disclosure.

In at least one embodiment of this disclosure, as shown in FIG. 5 and FIG. 6, the first protective layer 1 and the second protective layer 3 both have the porous structure 4.

Alternatively, as shown in FIG. 5, the polarizer further comprises: a connecting layer 6 arranged on a surface of the second protective layer 3 facing away from the polarizing layer 2, for connecting the second protective layer 3 and the glass substrate 5 to fabricate a display module.

Alternatively, the polarizer further comprises: a release film arranged on a surface of the connecting layer 6 facing away from the second protective layer 3.

According to the embodiment of the present disclosure, the porous structure in the first protective layer and the second protective layer can better prohibit the heat from the upper and lower sides of the figures from transferring to the polarizing layer, respectively, and can avoid shrinkage of the polarizing layer, and the thus fabricated display module can prevent the glass substrate from bending.

Of course, as shown in FIG. 6, it can also be that, the connecting layer 6 is arranged on a surface of the first protective layer 1 facing away from the polarizing layer 2, and the release film is arranged on a surface of the connecting layer facing away from the first protective layer 1. This can also realize the objective of the present application and does not depart from the design idea of the present disclosure, and thus is omitted here. However, all these shall fall into the scope of protection of the present application.

Alternatively, the first protective layer 1 and the second protective layer 3 comprise a cellulose triacetate layer, the polarizing layer 2 comprises a polyvinyl alcohol layer, and the connecting layer 6 comprises a pressure-sensitive adhesive layer.

Figure 7:
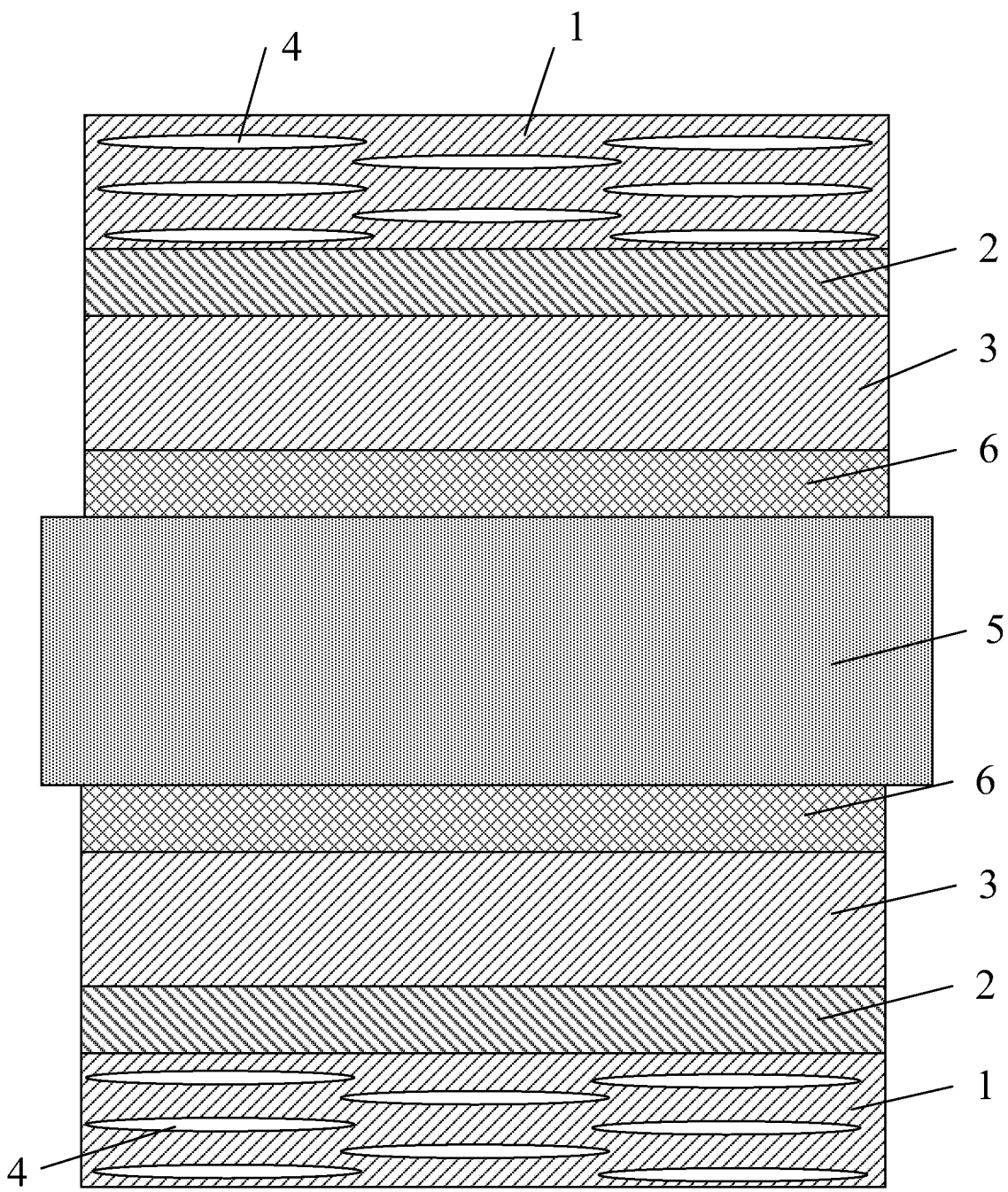
FIG. 7 is a schematic diagram showing a structure of the display module according to some embodiments of the present disclosure.

The liquid crystal display device provided according to the present disclosure comprises a display module (as shown in FIG. 7), and the display module has a polarizer according to any of the above embodiments.

This liquid crystal display device provided according to the present disclosure has all the advantages of the polarizer according to any of the above embodiments, and is not discussed here.

The display module is provided with two polarizers, wherein the absorption axis of one polarizer is horizontal and the absorption axis of the other polarizer is longitudinal.

To sum up, in the polarizer provided according to the present disclosure, at least one of the first protective layer and the second protective layer is provided with a porous structure. The porous structure can better prohibit the heat from transferring to the polarizing layer, and can avoid shrinkage of the polarizing layer, and the thus fabricated display module can effectively prevent the glass substrate from bending.

The thermal conductivity of the air inside the porous structure is smaller than that of the first protective layer and the second protective layer. In this way, the heat is more difficult to transfer through the porous structure to the polarizing layer, and the internal polarizing layer has a lower temperature and thus is not easy to shrink.

In the description of the present disclosure, the terms "installation", "connected", "connection", "fixed" and so on should be understood in a broad sense, for example, "connection" can be a fixed connection, a detachable connection, or an integrated connection; can be a direct connected, or an indirect connection through an intermediary medium. A person skilled in the art could understand exact meanings of the above terms in the present disclosure according to specific conditions.

In the description, the terms "one embodiment", "some embodiments", "specific embodiments" and so on mean that, specific features, structures, materials or characteristics described in combination with the embodiments or examples are contained in at least one embodiment or example of the present disclosure. In the description, illustrative expressions of the terms do not necessarily refer to the same embodiments or examples. Furthermore, the specific features, structures, materials, or characteristics described can be combined in an appropriate manner in any one or more embodiments or examples.

Although the embodiments of the present disclosure are described above, they are merely embodiments adopted for understanding the present disclosure and are not used to limit the present disclosure. Those skilled in the art could make various variations and modifications on the forms and details of the implementations without departing from the spirit and scope of the present disclosure, but the scope of patent protection of the present disclosure is still determined by the attached claims.

The invention claimed is:

1. A polarizer, comprising:
a first protective layer;
a polarizing layer, wherein the first protective layer is located on one layer surface of the polarizing layer; and
a second protective layer located on another layer surface of the polarizing layer;
wherein at least one of the first protective layer and the second protective layer has a porous structure,
the porous structure has a porosity which is larger than 10% and smaller than 30%,
a connecting layer located on a surface of the second protective layer facing away from the polarizing layer, and
a release film, located on a surface of the connecting layer facing away from the second protective layer.

2. The polarizer according to claim 1, wherein the porous structure has a pore size distribution of 3~5 μm.

3. The polarizer according to claim 1, wherein the porous structure is uniformly distributed on the at least one of the first protective layer and the second protective layer.

4. The polarizer according to claim 1, wherein a thermal conductivity of air inside the porous structure is smaller than those of materials of the first protective layer and the second protective layer.

5. A liquid crystal display device comprising the polarizer according to claim 1.

6. The liquid crystal display device according to claim 5, wherein the porous structure has a pore size distribution of 3~5 μm.

7. The liquid crystal display device according to claim 5, wherein the porous structure is uniformly distributed on at least one of the first protective layer and the second protective layer.

8. The liquid crystal display device according to claim 5, wherein a thermal conductivity of air inside the porous structure is smaller than those of materials of the first protective layer and the second protective layer.

9. A polarizer, comprising:
a first protective layer;
a polarizing layer, wherein the first protective layer is located on one layer surface of the polarizing layer; and
a second protective layer located on another layer surface of the polarizing layer;
wherein at least one of the first protective layer and the second protective layer has a porous structure,
the porous structure has a porosity which is larger than 10% and smaller than 30%,
a connecting layer located on a surface of the second protective layer facing away from the polarizing layer, and
the connecting layer comprises a pressure-sensitive adhesive layer.

10. The polarizer according to claim 9, wherein the porous structure has a pore size distribution of 3~5 μm.

11. The polarizer according to claim 9, wherein the porous structure is uniformly distributed on the at least one of the first protective layer and the second protective layer.

12. The polarizer according to claim 9, wherein a thermal conductivity of air inside the porous structure is smaller than those of materials of the first protective layer and the second protective layer.

13. A liquid crystal display device comprising the polarizer according to claim 9.

14. The liquid crystal display device according to claim 13, wherein the porous structure has a pore size distribution of 3~5 μm.

15. The liquid crystal display device according to claim 13, wherein the porous structure is uniformly distributed on at least one of the first protective layer and the second protective layer.

16. The liquid crystal display device according to claim 13, wherein a thermal conductivity of air inside the porous structure is smaller than those of materials of the first protective layer and the second protective layer.

17. A polarizer comprising:
a first protective layer;
a polarizing layer, wherein the first protective layer is located on one layer surface of the polarizing layer; and
a second protective layer located on another layer surface of the polarizing layer;
wherein at least one of the first protective layer and the second protective layer has a porous structure, the porous structure has a porosity which is larger than 10% and smaller than 30%, and
the first protective layer and the second protective layer comprise a cellulose triacetate layer, and the polarizing layer comprises a polyvinyl alcohol layer.

18. The polarizer according to claim 17, wherein the porous structure has a pore size distribution of 3~5 μm.

19. The polarizer according to claim 17, wherein the porous structure is uniformly distributed on the at least one of the first protective layer and the second protective layer.

20. The polarizer according to claim 17, wherein a thermal conductivity of air inside the porous structure is smaller than those of materials of the first protective layer and the second protective layer.

21. A liquid crystal display device comprising the polarizer according to claim 17.

22. The liquid crystal display device according to claim 21, wherein the porous structure has a pore size distribution of 3~5 μm.

23. The liquid crystal display device according to claim 21, wherein the porous structure is uniformly distributed on at least one of the first protective layer and the second protective layer.

24. The liquid crystal display device according to claim 21, wherein a thermal conductivity of air inside the porous structure is smaller than those of materials of the first protective layer and the second protective layer.

* * * * *